US006875965B2

(12) United States Patent  
Herzog (10) Patent No.: US 6,875,965 B2  
(45) Date of Patent: Apr. 5, 2005

(54) MULTIPLE HEAD INDUCTION SEALER APPARATUS AND METHOD

(76) Inventor: Kenneth J. Herzog, 200 Mill Rd., Riverhead, NY (US) 11901

( * ) Notice: Subject to any disclaimer, the term of this patent is extended or adjusted under 35 U.S.C. 154(b) by 0 days.

(21) Appl. No.: 10/721,926

(22) Filed: Nov. 25, 2003

(65) Prior Publication Data

US 2004/0104217 A1 Jun. 3, 2004

Related U.S. Application Data

(62) Division of application No. 09/775,318, filed on Feb. 1, 2001.
(60) Provisional application No. 60/229,711, filed on Aug. 31, 2000.

(51) Int. Cl.$^7$ ............................................. B23K 13/01
(52) U.S. Cl. ...................... 219/604; 219/633; 219/653; 219/672
(58) Field of Search ............................... 219/600, 602, 219/603, 604, 607, 617, 618, 633, 635, 645, 659, 653, 672–677; 156/274.2, 380.2; 361/676; 53/329.2

(56) References Cited

U.S. PATENT DOCUMENTS

| | | |
|---|---|---|
| 3,477,197 A | 11/1969 | Budz |
| 3,748,422 A | 7/1973 | Schäfer |
| 3,763,342 A | 10/1973 | Oppenheimer |
| 3,946,349 A | 3/1976 | Haldeman, III |
| 4,017,704 A | 4/1977 | Collins, III et al. |
| 4,095,390 A | 6/1978 | Knudsen |
| 4,114,009 A | 9/1978 | Kiuchi et al. |
| 4,122,321 A | 10/1978 | Cachat |
| 4,213,830 A | 7/1980 | Köppl |
| 4,237,360 A | 12/1980 | Pohlenz |
| 4,380,484 A | 4/1983 | Repik et al. |
| 4,488,668 A | 12/1984 | Flaska et al. |
| 4,506,131 A | 3/1985 | Boehm et al. |
| 4,516,104 A | 5/1985 | McDermott |
| 4,704,509 A * | 11/1987 | Hilmersson et al. ........ 219/633 |
| 4,707,213 A | 11/1987 | Mohr et al. |
| 4,757,175 A | 7/1988 | Mohr et al. |
| 4,819,414 A | 4/1989 | Worden et al. |
| 4,825,625 A | 5/1989 | Hufford |
| 4,845,332 A | 7/1989 | Jancosek et al. |
| 4,853,510 A | 8/1989 | Mohr et al. |
| 4,891,484 A | 1/1990 | Waggott et al. |
| 4,899,025 A | 2/1990 | Kamp et al. |
| 5,022,531 A | 6/1991 | Horino et al. |

(Continued)

FOREIGN PATENT DOCUMENTS

| | | |
|---|---|---|
| DE | 4213830 | 11/1993 |
| EP | 0408230 | 1/1991 |
| WO | 97/22523 | 6/1997 |

OTHER PUBLICATIONS

Product Brochure, Lepel Cap Sealing, Product Selection Guide. No publication date available.

(Continued)

*Primary Examiner*—Tu Hoang  
(74) *Attorney, Agent, or Firm*—Ostrolenk, Faber, Gerb & Soffen, LLP (57) ABSTRACT

A multiple head induction sealing system includes at least two ferrite cores mounted which are channel-shaped and arranged so that the open ends of the channels are aligned either perpendicular or parallel to a workflow direction established as the objects to be heated pass beneath the unit. A litz wire coil is disposed proximate to each ferrite core which produces an electromagnetic field within the ferrite core. The ferrite cores and litz wire coil are adapted to direct the electromagnetic field toward an object to heat it.

14 Claims, 8 Drawing Sheets

U.S. PATENT DOCUMENTS

| | | |
|---|---|---|
| 5,034,586 A | 7/1991 | Havas et al. |
| 5,059,762 A | 10/1991 | Simcock |
| 5,101,086 A | 3/1992 | Dion et al. |
| 5,109,653 A | 5/1992 | Kubis et al. |
| 5,230,427 A | 7/1993 | Betts et al. |
| 5,321,934 A | 6/1994 | Bech |
| 5,349,167 A | 9/1994 | Simcock |
| 5,381,913 A | 1/1995 | Peeters |
| 5,397,877 A | 3/1995 | Couffet et al. |
| 5,430,273 A | 7/1995 | Bogdanski et al. |
| 5,444,963 A | 8/1995 | Steingroever et al. |
| 5,461,215 A | 10/1995 | Haldeman |
| 5,513,781 A | 5/1996 | Ullrich et al. |
| 5,523,546 A | 6/1996 | Lake |
| 5,822,669 A | 10/1998 | Okabayashi et al. |
| 5,847,370 A | 12/1998 | Sluka et al. |
| 5,848,319 A | 12/1998 | Morigami et al. |
| 6,035,607 A | 3/2000 | Miller |
| 6,043,471 A | 3/2000 | Wiseman et al. |
| 6,078,033 A | 6/2000 | Bowers et al. |

OTHER PUBLICATIONS

Product Brochure, Pillar Foiler Capsealing System, Pillar Technologies Ltd. Partnership. No publication date available.

"Coil Design Holds Key To Improving Induction Cap Sealing Efficiency," Ronald F. May, Journal of Packaging Technology Jan./Feb. 1991.

* cited by examiner

MULTIPLE HEAD INDUCTION SEALER APPARATUS AND METHOD

CROSS-REFERENCE TO RELATED APPLICATIONS

This application is a division of U.S. application Ser. No. 09/775,318, filed Feb. 1, 2001, entitled Multiple Head Induction Sealer Apparatus and Method which is based on and claims priority to U.S. Provisional Patent application Ser. No. 60/229,711, filed Aug. 31, 2000, entitled "Multiple Head Induction Sealer" which is related to patent application Ser. No. 09/138,159, filed Aug. 21, 1998, entitled "Induction Foil Cap Sealer" which is a continuation of patent application Ser. No. 08/966,305, filed Nov. 7, 1997, now abandoned, which is related to Patent application Ser. No. 60/030,488, filed Nov. 15, 1996, now abandoned, and also related to patent application Ser. No. 09/693,032, filed Oct. 20, 2000, entitled "Induction Foil Cap Sealer", now pending, the entire contents of all are incorporated herein by reference.

BACKGROUND OF THE INVENTION

1. Field of the Invention

The present invention relates to an induction sealer and more particularly to an improved induction sealer that utilizes multiple induction heads to provide uniform heating to seal containers and other similar items.

2. Related Art

Induction sealing units for sealing, hermetically sealing or tamper-proof sealing a container with a foil liner are typically included in conveyor systems for high volume applications. These systems usually have flat or tunnel sealing heads mounted above a conveyor, which conveyor carries a plurality of containers to be sealed into proximity with the sealing head. A discussion of the general principles of inductive sealing is disclosed in pending application Ser. No. 09/138,159, the entire contents of which is incorporated herein by reference.

The containers to be sealed are preconditioned to include a foil liner disposed over the opening of the container. Usually, the foil liner is held in place by a screw-on or snap-on cap as is known in the art. Sometimes a wax compound and a paper board portion are included above the foil liner.

Once the preconditioned container is brought within a predetermined distance from the sealing head, a coil within the sealing head produces an electromagnetic field near the foil liner which is disposed within the cap. The electromagnetic flux produced by the field causes current to flow in the foil liner which heat seals the foil liner to the opening of the container, thus sealing the container. The downward force applied by the cap during the sealing operation ensures a proper bond between the foil liner and the opening of the container.

Figure 1:
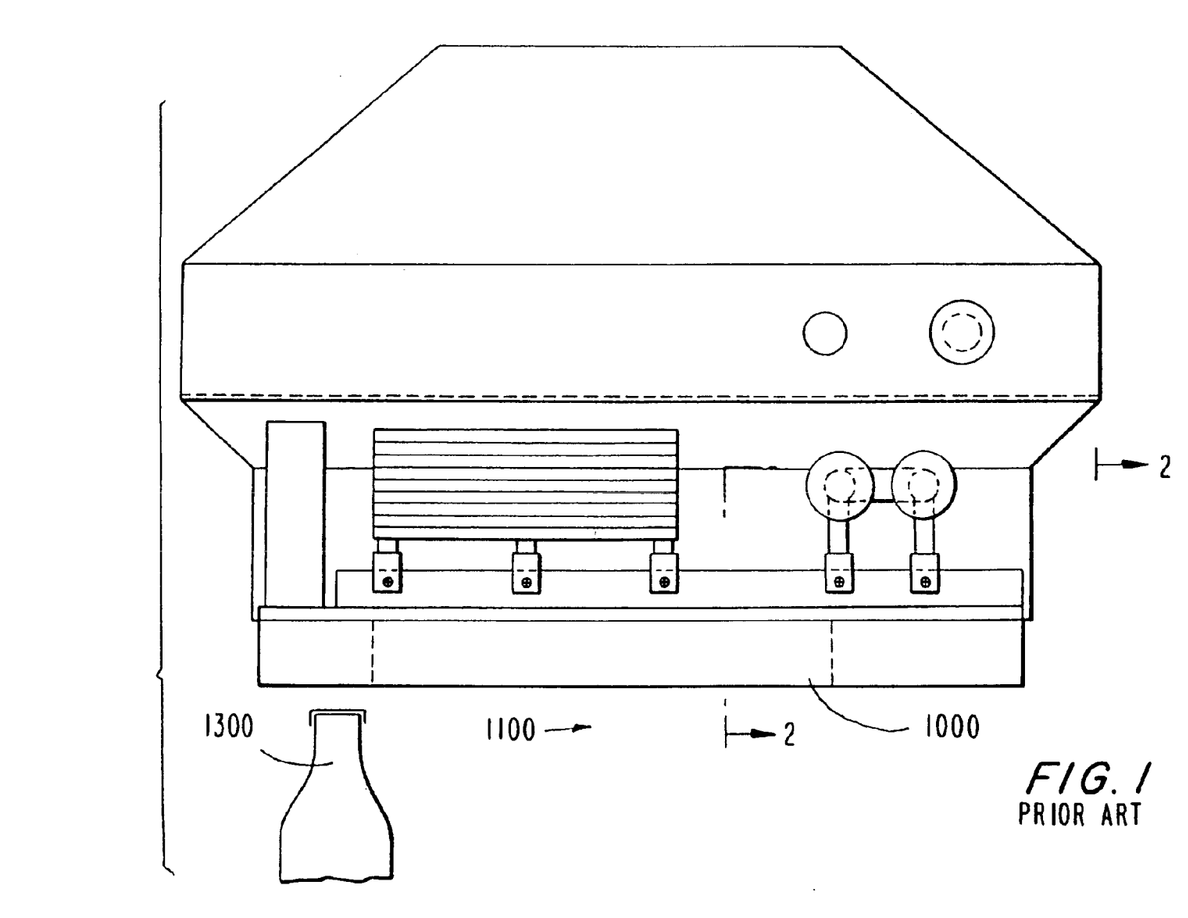
FIG. 1 is a side view of a prior sealing head showing the head arranged parallel with the product workflow.
Figure 2:
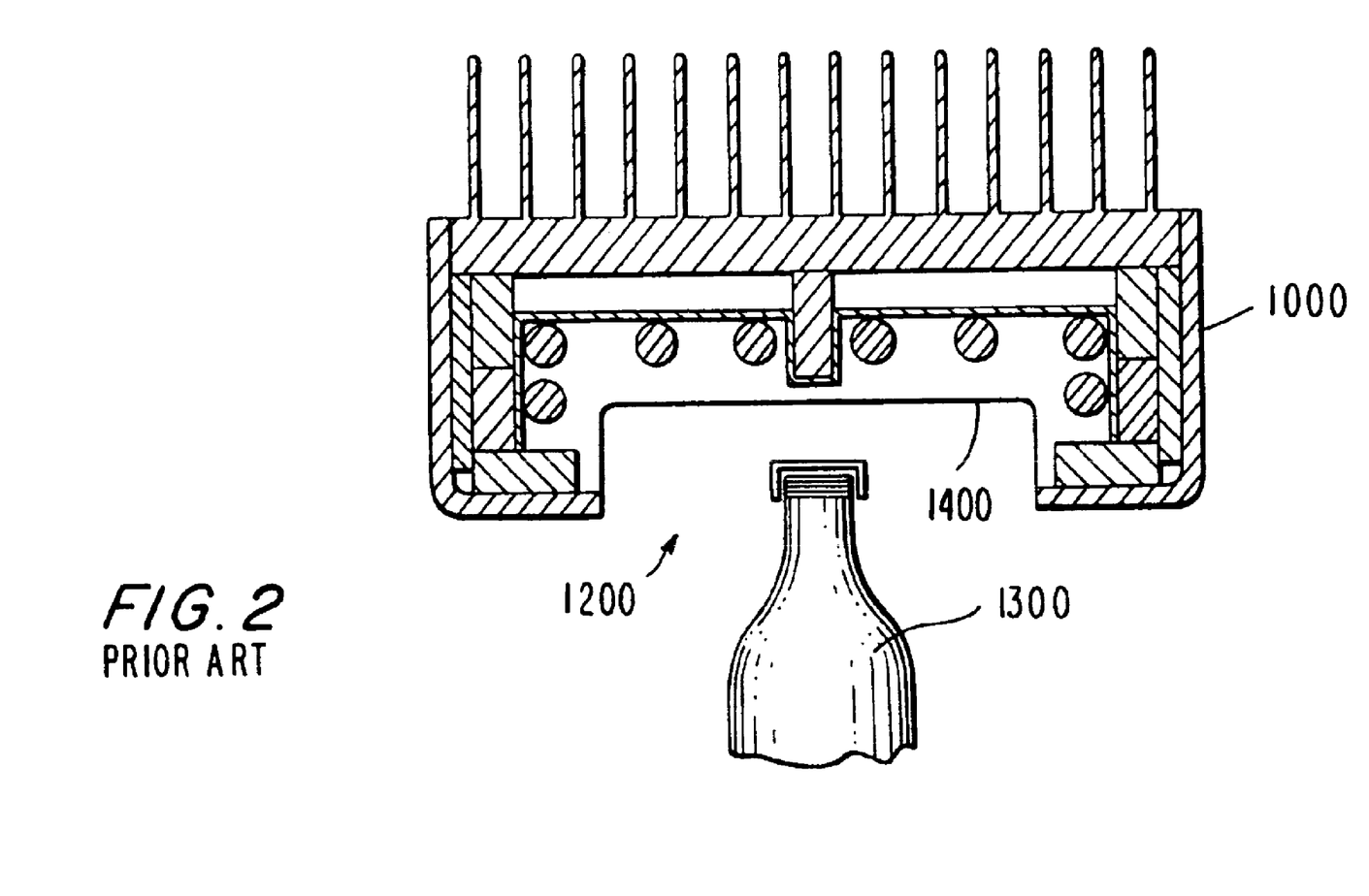
FIG. 2 is a cutaway end view taken along line 2—2 of FIG. 1.

Prior art induction sealing units have aligned the induction heads to be parallel to the direction of travel of the containers to be sealed. For example, see pending application Ser. No. 09/138,159 for a description of an induction sealer which aligns the induction head parallel to the workflow direction. As shown in FIGS. 1 and 2, herein, such a sealer includes a sealing head 1000 arranged so that an elongated portion is aligned with the direction of workflow 1100 of a container 1300. As seen in FIG. 2, the head forms a channel 1200 in a ferrite core 1400 under which container 1300 travels. The containers 1300 thus travel beneath the head 1000 in a channel 1200 created within the ferrite core 1400 which is oriented parallel to the direction 1100 of workflow.

This orientation, while operable, causes certain heating problems. The magnetic field is generally oriented along the ferrite core 1400 causing a cap traveling through the induction sealing unit to experience a substantially continuous heating pattern until exiting the unit. This leads to uneven heating.

In small caps (under 70 mm), this uneven heating pattern does not significantly hamper operation. However, when the cap size is large (usually 70 mm or greater), uneven heating of the foil liner causes sealing failures. As a large cap approaches the induction field, the leading and trailing edges (the edges that approach the field perpendicularly) become hotter than the edges approaching the field in a parallel direction and these "hot spots" continue to heat the entire time the container is passing under the head. If sufficient heat is not generated in the parallel edges, the container is not sealed properly.

To overcome this problem, the field intensity can be increased or the time that the container spends in the field can be increased. In either case, due to the uneven heating effect discussed above, the leading and trailing edges can become too hot and can actually start to burn. This condition leads to improper sealing as well as creating a potential fire hazard.

Another way to overcome this problem is to offset the induction sealing unit at an angle with respect to the direction of workflow. This means that different parts of the cap will encounter varying field intensity since the field is at an angle. While helping, this solution is deficient in at least two respects. First, although no point on the rim of the container experiences constant heating, (depending on the angle of the unit with respect to workflow) regions of the cap still tend to over or under heat. A critical balance must, therefore, be achieved to produce satisfactory sealing. This makes the sealing unit more sensitive to fluctuations in operating parameters such as intensity of the field and time spent in the field.

Second, even though offsetting the induction sealing unit helps to alleviate the problems associated with uneven heating, it complicates the set up and makes operating the unit more difficult. Small variations in the angle can require recalibration. Setup is more complicated since the unit cannot simply be aligned with the workflow. Additionally, because different size caps respond differentially, it may require changing the angle of the induction sealer unit each time a different size cap, seal (e.g., foil seal) or other container is processed.

Thus, there is a need for an induction sealing unit that uniformly heats the lids or other similar items to be sealed, especially when utilizing cap sizes larger than 70 millimeters, which does not require angling even when using different size caps, seals or other containers and is, therefore, easier to install, maintain and operate.

SUMMARY OF THE INVENTION

Accordingly, it has been found that the above deficiencies can be overcome in a multiple head induction sealing unit having at least two sealing heads.

In one embodiment, each sealing head includes a ferrite core which is aligned perpendicular to the workflow direction. An inductive electromagnetic field is generated using a conductive coil, which may be a litz wire coil disposed proximate to the ferrite cores. The ferrite cores and conductive coil are adapted to direct the electromagnetic field towards an object to be heated, such as a foil used to seal the opening of a container.

In another embodiment, each sealing head is aligned parallel to the workflow direction, but by utilizing multiple heads, the container to be heated is exposed to a variable value electromagnetic field which tends to even out the heating overall.

The multiple head induction sealing unit may also include a heat sink or heat sinks coupled to the housing, where at least part of the ferrite cores are bonded or operatively coupled to the heat sink for transferring heat thereto. The use of a thermally conductive ceramic material may be used to facilitate the heat transfer from the ferrite cores and the litz wire.

The multiple head induction sealing unit may also include air cooled ferrite cores with flow-through channels created in them to draw away excess heat.

Other features and advantages of the present invention will become apparent from the following description of the invention which refers to the accompanying drawings.

BRIEF DESCRIPTION OF THE DRAWINGS

For the purpose of illustrating the invention, there are shown in the drawings embodiments which are presently preferred, it being understood, however, that the invention is not limited to the precise arrangements and instrumentalities shown.

DETAILED DESCRIPTION OF THE PREFERRED EMBODIMENT

Figure 3:
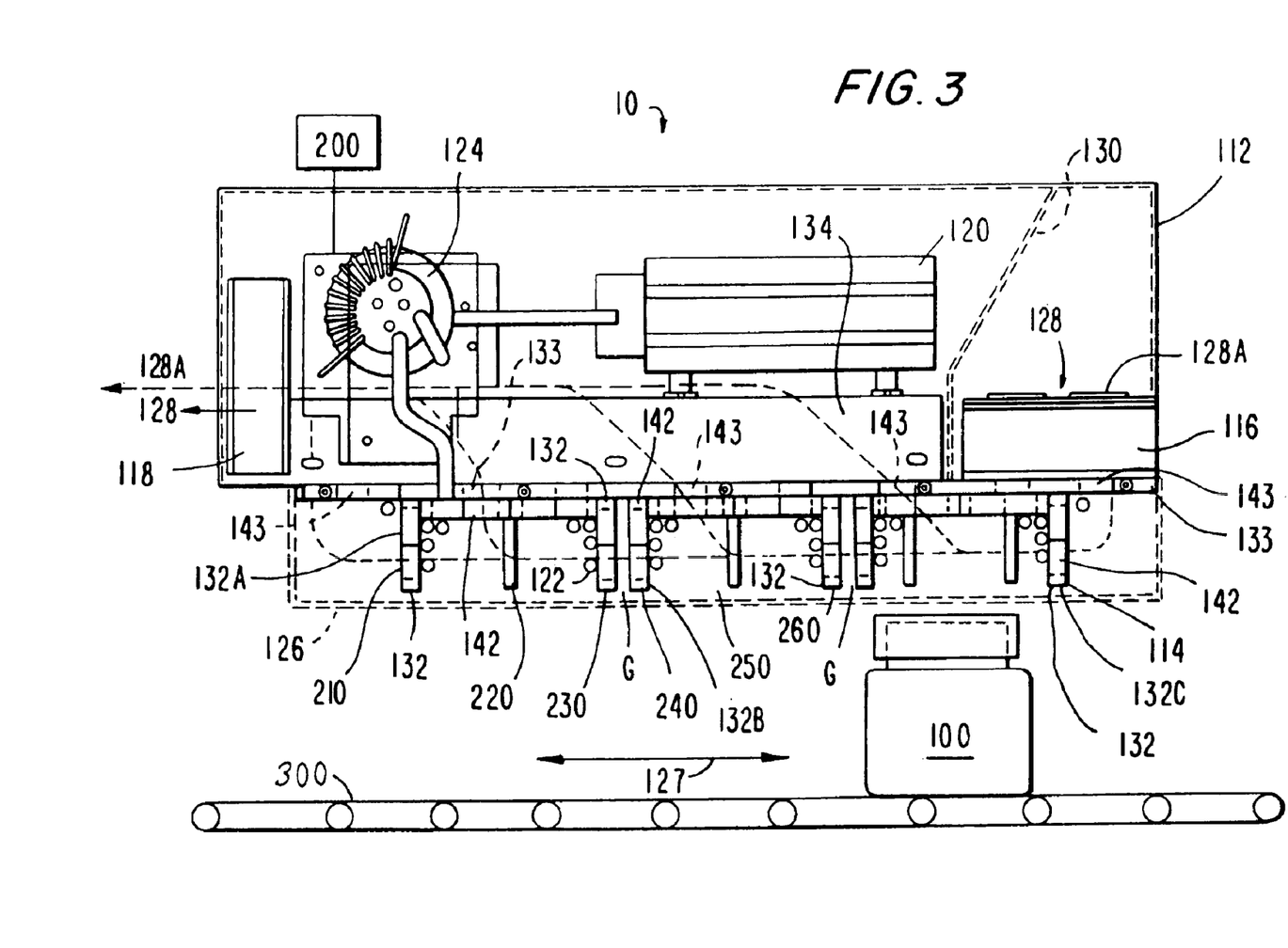
FIG. 3 shows a side view of a multiple head induction sealing unit according to the present invention.

Referring now to the drawings wherein like numerals indicate like elements, there is shown in FIG. 3, a multiple head induction sealing unit 10 according to the present invention.

Sealing unit 10 comprises a housing 112 and at least two sealing heads 132 (three being shown in FIG. 3, although only two are necessary). The components within housing 112 includes a capacitor 120, an intake fan 116, an outtake fan 128, a transformer 124 electrically connected to the capacitor 120 and a power supply 200 electrically connected to the transformer 124. A horizontal mounting plate 133 is used to securely anchor the sealing heads 132 to the housing 112.

Each sealing head 132 includes a litz wire coil 122 mounted within the head 132 and is electrically connected to the transformer 124.

The three sealing heads 132 are aligned side by side. Each sealing head 132 includes a U-shaped ferrite core 114. Each ferrite core 114 is secured to the horizontal mounting plate 133 with a heat resistant epoxy. Each ferrite core 114 is mounted to the horizontal mounting plate 133 so that the open ends of the channel shaped ferrite core 114 are perpendicular to a workflow direction 127 that containers 100 to be sealed move along when passing beneath sealing unit 10. The containers 100 pass beneath the sealing unit 10 preferably on a conveyor system 300 that establishes the workflow direction 127. The three side by side sealing heads 132 intersect the workflow direction 127 perpendicularly. In other words, the sealing heads 132 are oriented 90° or perpendicular to the workflow direction 127. By using multiple heads which are rotated by 90°, the electromagnetic field is essentially perpendicular to the workflow direction 127, therefore, the containers 100 are evenly heated as they pass beneath the unit 10. The plurality of sealing heads 132 uniformly heat the containers 100 or other similar items as they pass under each head 132. Localized heating and cooling problems associated with other sealing heads are eliminated.

In contrast, in prior art sealing units (see FIGS. 1 and 2 for example), the single inductive head 1000 includes a channel 1200 with the open ends of the channel 1200 parallel to the direction of the workflow 1100.

The multiple head sealing unit 10 of the present invention, can be used to reliably seal large containers and other similar items without the "fine-tuning" required in other sealing units. This allows the present invention to easily switch between different size items without changing the orientation of the heads. Because the unit uses relatively short multiple heads, rather than one elongated head, the size of the unit can be minimized to produce a compact unit that reliably seals various size containers, even very large ones.

Each sealing head 132 is made up of the ferrite core 114 and the litz wire coil 122 proximally disposed within ferrite core 114. An inductive electromagnetic field is generated in the litz wire coils 122 which are disposed proximate to the ferrite cores 114. The ferrite cores 114 and litz wire coils 122 are adapted to direct the electromagnetic field towards a foil (not shown) used to seal the opening of a container 100 with the foil.

It is preferred that each ferrite core 114 be electrically isolated from the other cores. This is most easily achieved by simply leaving a gap "G" between each core 114. Alternatively, an insulating material, not shown, can be disposed between cores 114 to electrically isolate them from each other.

Figure 4:
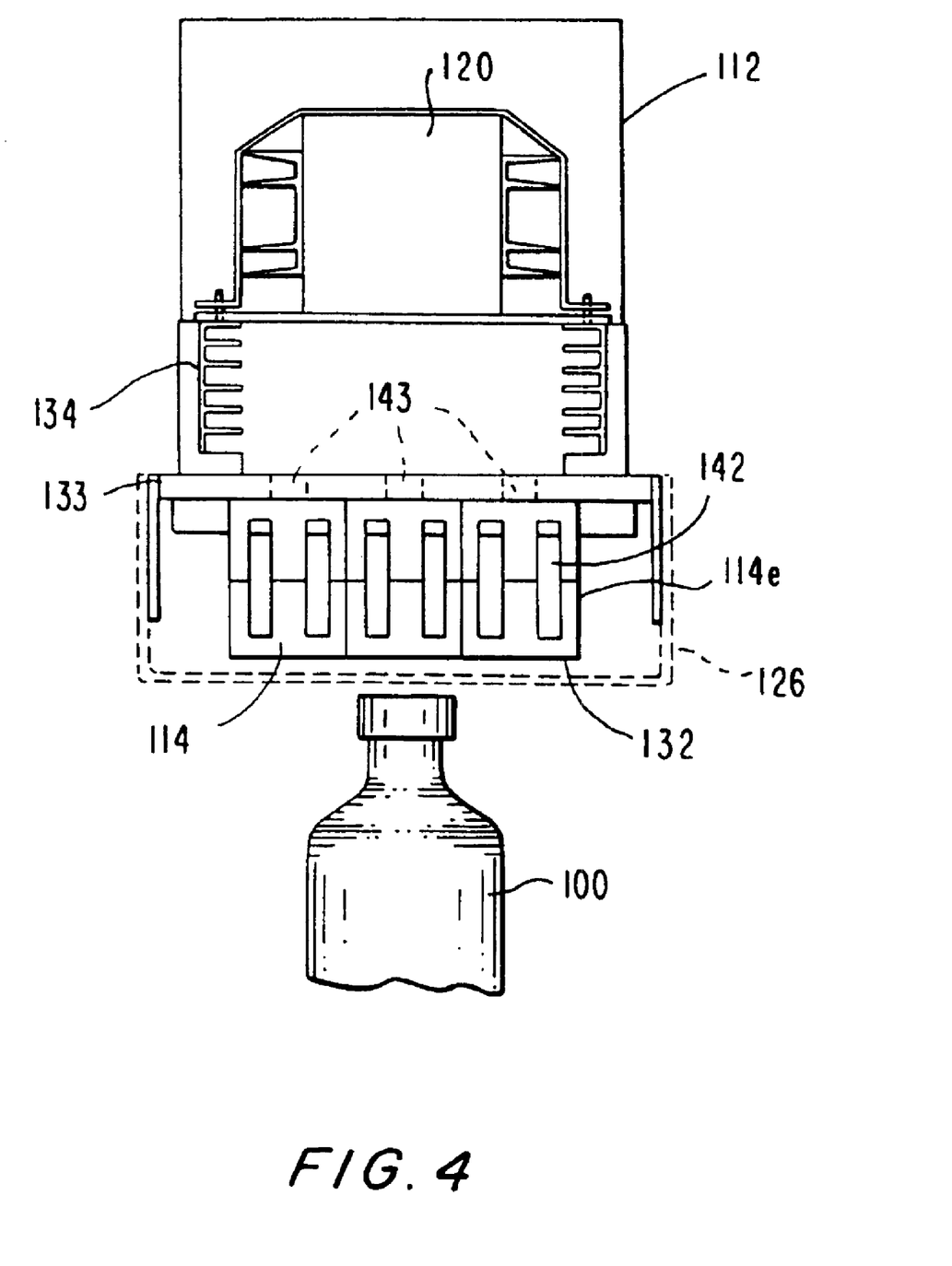
FIG. 4 is an end view of the multiple head induction sealing unit according to the present invention.
Figure 5:
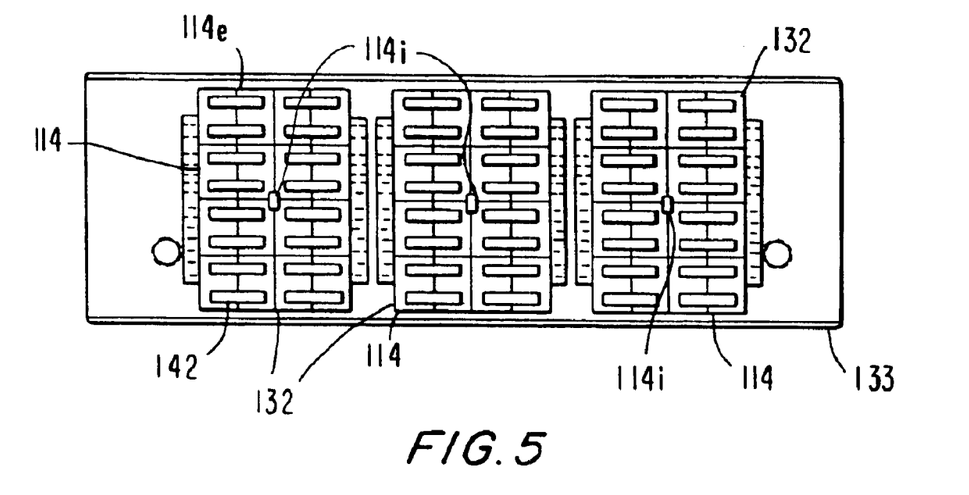
FIG. 5 is a bottom plan view of the multiple head induction sealing unit according to the present invention showing the ferrite cores.

Referring to FIGS. 4 and 5, although commercially manufactured ferrite elements come in many shapes, it is preferred to construct the core from individual ferrite elements of two shapes: "E"-shaped elements 114e and "I"-shaped elements 114i. It is preferred to bond individual ferrite elements 114e and 114i with an epoxy material to each other and to horizontal mounting plate 133. Litz wire coil 122 may also be bonded to core 114 with an epoxy or alternatively may be attached with strapping tie downs or any other method of tightly holding coil 122 against cores 114. By building up core 114 from these shapes, slots 142 can be formed within core 114 to facilitate cooling.

By forming core 114 with slots 142, a cooling gas, preferably air, is able to be drawn through core 114 significantly increasing the surface area of the cooling surface exposed to the cooling air. The extra surface area facilitates the heat transfer from the core 114 to the air 128 which is then exhausted through the outtake fan 118. The cooling air 128 is drawn in through the intake fan 116 and is directed down by a baffle 130 and through the slots 143 formed in the horizontal mounting plate 133. The slots 143 (formed in horizontal mounting plate 133) are aligned with the slots 142 formed in the core 114 in order to allow the air 128 to flow through the core 114 to cool it as shown by air flow path 128a.

Of course, any shape core can be utilized as long as it concentrates the magnetic field to a value sufficient to operate properly. Further, although cores 114 constructed of "E"-shaped and "I"-shaped elements are preferred, the cores 114 may be unitary or constructed of individual elements of different shapes. It is within the scope of this invention to include any satisfactory ferrite core as long as there are at least two cores mounted side by side and perpendicular to the workflow direction 127.

Additionally, it is known in the art to cool ferrite heads with a liquid, and although not preferred, it is within the scope of this invention to include liquid, or any other means known in the art to cool the ferrite cores.

In an alternate embodiment, the sealing heads can be of the type described in patent application Ser. No. 09/138,159 entitled "Induction Foil Cap Sealer" filed Aug. 21, 1998. In this embodiment, a thermally conductive ceramic material may be used to provide a thermally conductive path for heat to be transferred from the ferrite cores 114 to a heat sink 134 (see FIG. 4). If a thermally conductive material is used, the slots 142 are filled with a thermally conductive material, such as Aremco CERAMACAST™ 510 powder (which is mixed with water and applied using directions on container thereof) or other suitable materials known in the art. CERAMACAST™ 510 powder may be obtained from Aremco Products, Inc. or from any of known suppliers. After thermally conductive material has been applied to the cores 114 (and filling the slots 142) a potting material may be used to fill in any gaps between the cores 114, coil 122 and cover 126.

In the slot-filled embodiment, it is preferable to use a material which is suitable for both: (i) providing a thermally conductive medium through which heat is transferred from the surface area within slots 142 of ferrite cores 114 to heat sink 134 and (ii) locking cover 126 to ferrite cores 114 and litz wire coils 122, thus rigidly maintaining the form of the structure without using a potting material.

Figure 6:
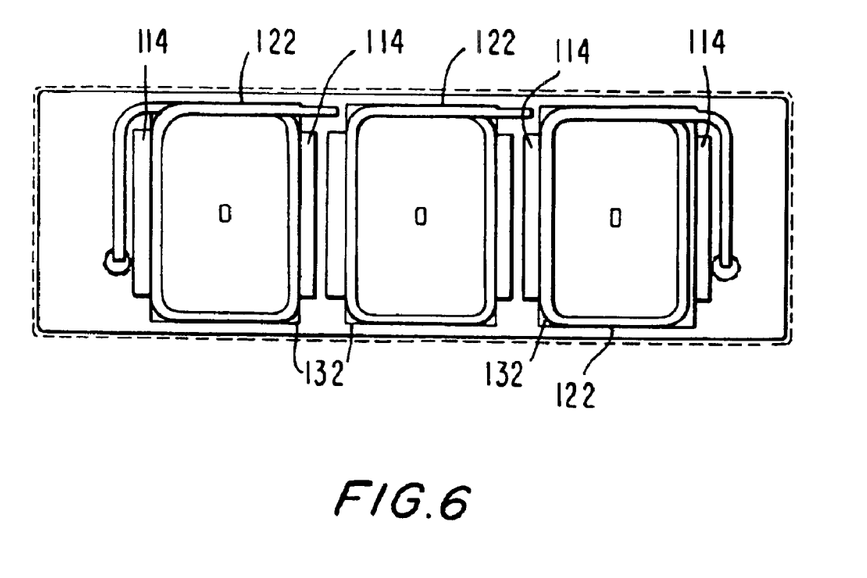
FIG. 6 is a bottom view showing litz wires within the ferrite core according to an embodiment of the present invention.
Figure 7:
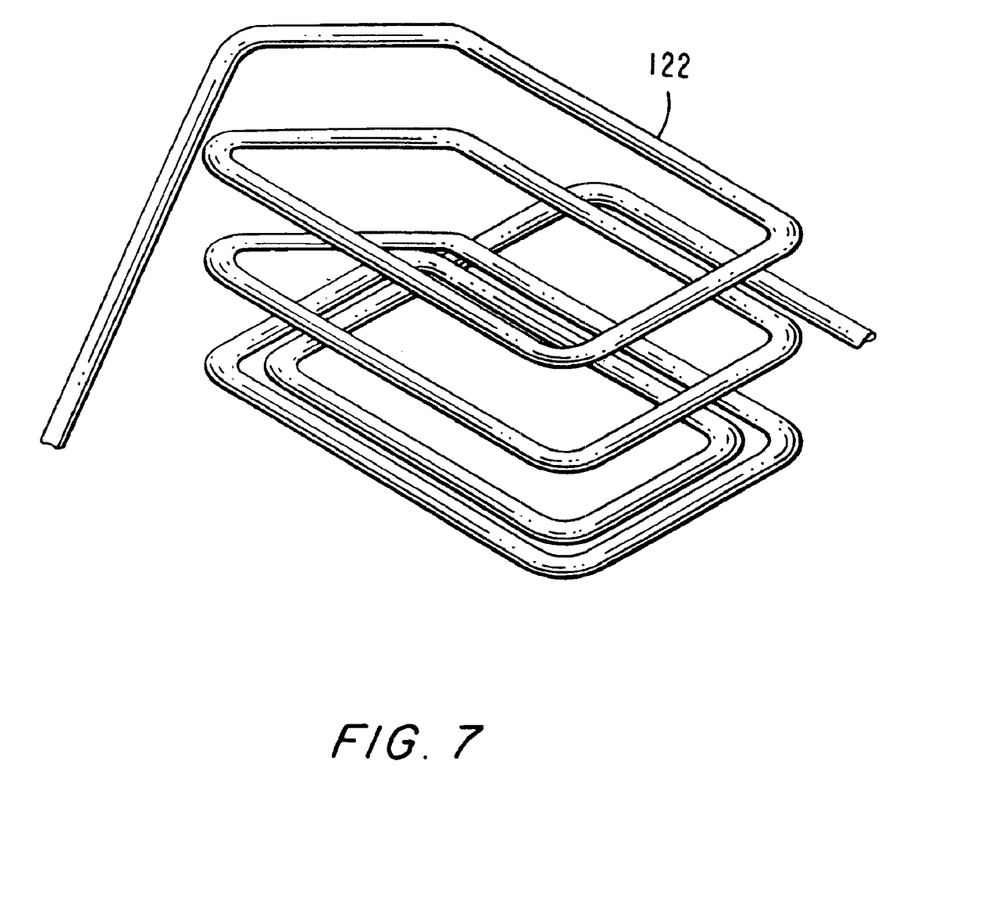
FIG. 7 is a three-dimensional view of a litz wire coil used in an embodiment of the present invention.

The operation of the litz wire coil 122 will now be described with reference to FIGS. 6 and 7. The litz wire coil 122 is operatively coupled to the ferrite core 114 by winding the coil 122 against the ferrite core 114. the litz wire coil 122 is used to direct and concentrate the electromagnetic field within the ferrite cores 114. FIG. 6 shows a bottom view of a layout of a three-headed unit with the litz wire coil 122 highlighted. A three dimensional view of a section of the litz wire coil 122 is shown in FIG. 7.

Preferably, the litz wire coil 122 includes thousands of individually insulated electrical conductors surrounded by an insulating sheath not shown, made from polyethylene, polypropylene, Teflon, or the like, which also electrically insulates the litz wire coil 122 from the surrounding structures, including the ferrite cores 114.

The litz wire coil 122 has a very low resistance to the flow of current as compared to the copper used to carry the current in conventional induction sealers. Of course, any conducting material may be used, but because high frequency current tends to flow near the surface of a conductor (known as the "skin effect"), the use of multi-strand litz wire reduces the resistance of coil 122 to current flow making it more efficient and requiring less power to operate. The use of the litz wire coil 122 also reduces the heat generated by the unit rendering it easier to cool. Litz wire having about 4,000 strands of individually insulated conductors is available commercially. However, it is preferred that litz wire having about 10,000 insulated strands therein be used in the litz wire coil 122. Such 10,000 strand litz wire can be obtained from any of known suppliers. The litz wire coil 122 is sized such that the effective resistance per unit length is only about 0.1 to 0.01 of the resistance per unit length of the copper used heretofore. Consequently, the heat produced within the litz wire coil 122 (due to $I^2R$ losses) is reduced by a factor somewhere between 10–100 times. This allows the multiple head induction sealing unit 10 to be air cooled rather than liquid cooled.

A power supply 200 generates high frequency current within the litz wire coil 122 to produce electromagnetic fields of sufficient strength to cause a foil liner (not shown) of container 100 (FIG. 1) to heat. The power supply needs to deliver sufficient power to operate the unit 10 without overheating.

The present invention may be driven by any appropriate heretofore known power supplies (which include control electronics and solid state switching components).

In operation, referring to FIG. 3, the container 100 approaches the multiple head sealing unit 10 by traveling along a conveyor 300. As the container passes beneath the unit 10, the container first passes beneath the initial sealing head 132a and moves perpendicular to a first ferrite wall 210; continues forward in the workflow direction 127 and passes beneath an initial channel region 220, then approaches a trailing ferrite wall 230; then past the gap G; then beneath at least a second leading ferrite wall 240, continuing through a second channel region 25, then a second trailing ferrite wall 260 and continues the above pattern for each head 132 utilized. By moving as described above, the container 100 to be sealed experiences a constantly changing electromagnetic field so as to insure that no one point is either over heated or insufficiently heated.

Figure 8:
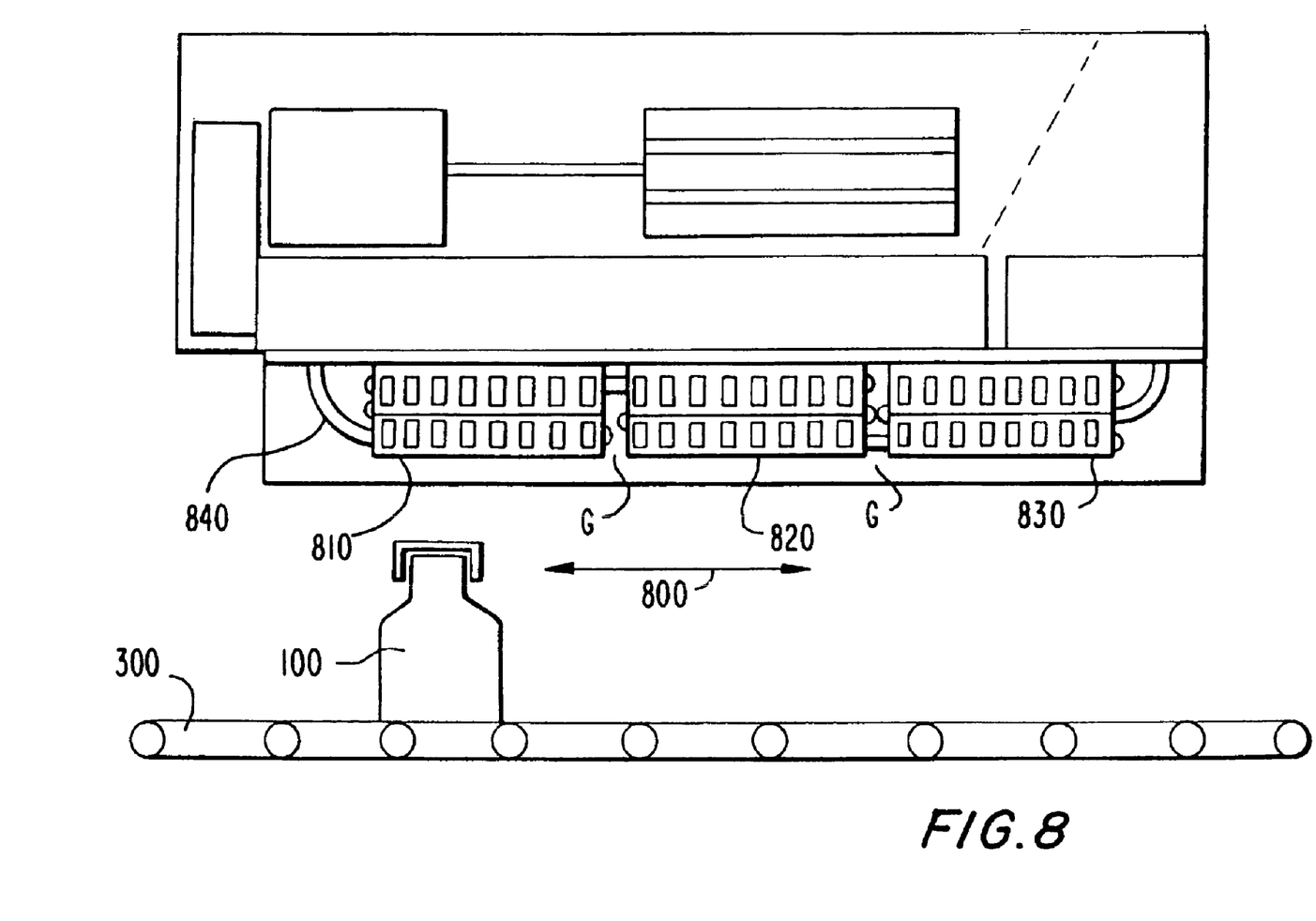
FIG. 8 is a side view of another embodiment of a multiple head induction sealing unit according to the invention.
Figure 9:
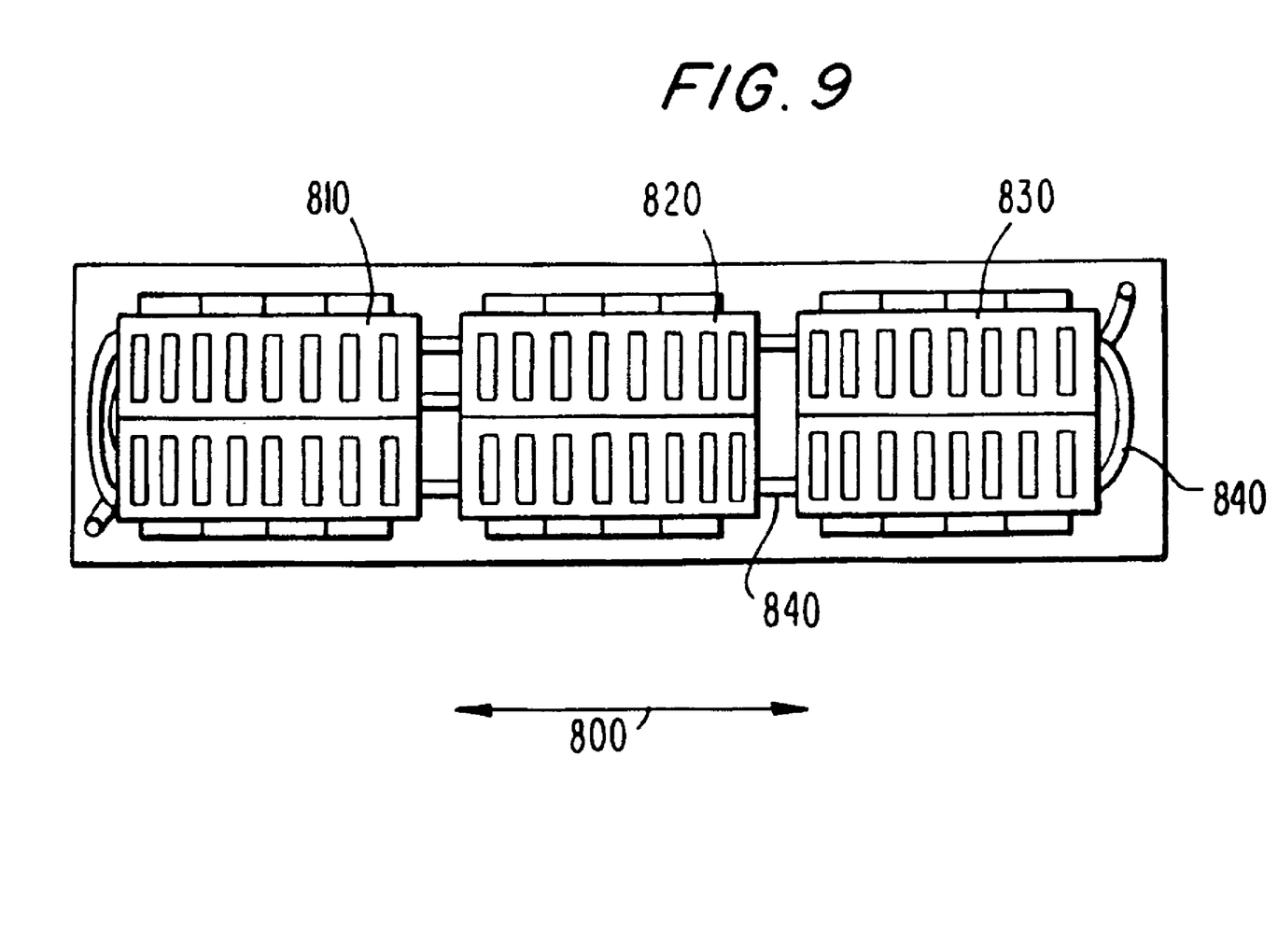
FIG. 9 is a bottom plan view of the embodiment of FIG. 8.

Referring to FIGS. 8 and 9, there is shown an alternative embodiment in which three sealing heads (810, 820 and 830 respectively) are aligned so that the open ends of the channel-shaped cores are parallel with the workflow direction 800 of the containers 100. Gaps G between the cores serve to isolate each core from the others. Litz wire coil 840 is disposed against the cores (810, 820 and 830) to direct the electromagnetic field as discussed above. As the container 100 moves along conveyor 300, container 100 experiences a changing inductive field which moderates the formation of hot and cold spots.

Of course, although the invention is discussed in terms of sealing a container having a foil liner and a cap, it would be clear to one skilled in the art that other embodiments are possible within the scope of the present invention that would seal or heat other workpieces, not necessarily containers. The present invention works by inducing an electromagnetic field in a workpiece which cause that workpiece to heat up. Other embodiments which for example, seal a metal container by melting a solder material are within the scope of the present invention and merely represent particular uses of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A multiple head induction sealing unit for sealing objects traveling in a predetermined workflow direction comprising:
    at least two induction heads;
    at least two ferrite cores, each core disposed in a respective head;
    each ferrite core structured and arranged to form a channel-shaped core having a longitudinal channel, the longitudinal channel being perpendicular to the workflow direction;
    at least one conductive coil disposed inside the longitudinal channel of each ferrite core structured and arranged to direct an electromagnetic field towards an object to be heated without making contact with the object.

2. The multiple head induction sealing unit of claim 1, wherein the at least one conductive coil is a litz wire coil.

3. The multiple head induction sealing unit of claim 1, further comprising:
    a housing;
    a multiple head inductive sealing unit connected to the housing, the multiple head sealing unit including the at least two ferrite cores.

4. The multiple head induction sealing unit of claim 3, further comprising:
    at least one cooling fan disposed in the housing;
    the at least one cooling fan being directed to circulate a cooling gas through a plurality of core openings within the at least two ferrite cores, whereby cooling is achieved without water.

5. The multiple head induction sealing unit of claim 4, further comprising a heatsink operably coupled to the at least two ferrite cores for drawing heat away from the ferrite cores.

6. The multiple head induction sealing unit of claim 5, wherein the at least one cooling fan also directs the cooling gas across the heatsink.

7. The multiple head induction sealing unit of claim 3 further comprising:
    at least one intake fan disposed in the housing;
    at least one outtake fan disposed in the housing;
    each of the ferrite cores having a plurality of openings therein; and
    the at least one intake fan arid the at least one outtake fan structured and arranged within the housing to cooperatively circulate a cooling gas through the plurality of core openings within the at least two ferrite cores, whereby cooling is achieved without water.

8. The multiple head induction sealing unit of claim 1, wherein each of the at least two ferrite cores include individual ferrite elements.

9. The multiple head induction sealing unit of claim 8, wherein the individual ferrite elements include E-shaped ferrite elements structured and arranged with an open end of one E-shaped ferrite element facing an open end of another E-shaped ferrite element, thereby forming a plurality of core openings.

10. The multiple head induction sealing unit of claim 3, further comprising a cover attached to the housing the cover substantially covering a downwardly projecting portion of the at least two ferrite cores.

11. The multiple head induction sealing unit of claim 2, further comprising: an energizing assembly including at least:
    the litz wire coil;
    a capacitor electrically connected to the litz wire coil and a transformer; and
    a power supply electrically coupled to the transformer.

12. The multiple head induction sealing unit of claim 1 further comprising:
    a mounting plate;
    the at least two channel-shaped ferrite cores mounted on the mounting plate.

13. The multiple head induction sealing unit of claim 12, wherein
    the mounting plate has a plurality of plate openings therethrough;
    each of the at least two ferrite cores has a plurality of core openings therethrough and is mounted to the mounting plate such that the plurality of plate openings and the core openings coincide with each other to allow a cooling gas to flow therethrough; and
    a litz wire coil is disposed proximate to each of the at least two ferrite cores structured and is arranged to direct an electromagnetic field towards an object to be heated.

14. The multiple head induction sealing unit of claim 1 further comprising:
    a conveyor structured and arranged to move objects to be sealed in a predetermined workflow direction;
    the at least two ferrite cores being disposed above the conveyor.

* * * * *